(12) United States Patent
Humphrey et al.

(10) Patent No.: US 8,335,933 B2
(45) Date of Patent: Dec. 18, 2012

(54) TWO-PARTY STORAGE OF ENCRYPTED SENSITIVE INFORMATION

(75) Inventors: Matthew G. Humphrey, Issaquah, WA (US); Ashvin J. Mathew, Kirkland, WA (US); Michael A. Wilde, Bothell, WA (US); Costel Radu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 770 days.

(21) Appl. No.: 12/371,496

(22) Filed: Feb. 13, 2009

(65) Prior Publication Data

US 2010/0208889 A1 Aug. 19, 2010

(51) Int. Cl.
*G06F 11/30* (2006.01)
(52) U.S. Cl. ...................................................... 713/193
(58) Field of Classification Search .................... 713/193
See application file for complete search history.

(56) References Cited

U.S. PATENT DOCUMENTS

| | | | | |
|---|---|---|---|---|
| 6,085,323 | A * | 7/2000 | Shimizu et al. | 713/150 |
| 6,904,418 | B2 | 6/2005 | Walker et al. | |
| 7,120,249 | B2 | 10/2006 | Roberts | |
| 7,240,192 | B1 * | 7/2007 | Paya et al. | 713/152 |
| 7,299,357 | B2 * | 11/2007 | Karamchedu et al. | 713/171 |
| 7,370,199 | B2 | 5/2008 | Aday et al. | |
| 7,373,507 | B2 | 5/2008 | Simms | |
| 2003/0028493 | A1 * | 2/2003 | Tajima et al. | 705/67 |
| 2004/0030916 | A1 * | 2/2004 | Karamchedu et al. | 713/200 |
| 2004/0030917 | A1 * | 2/2004 | Karamchedu et al. | 713/200 |
| 2006/0155996 | A1 | 7/2006 | Preist et al. | |
| 2009/0235303 | A1 * | 9/2009 | Yamaoka et al. | 725/31 |
| 2011/0222687 | A1 * | 9/2011 | Mori | 380/200 |

FOREIGN PATENT DOCUMENTS

| WO | WO-2006/130991 | 12/2006 |
|---|---|---|
| WO | WO-2007/131275 | 11/2007 |

OTHER PUBLICATIONS

Kolesnikov, V., "Secure Two-Party Computation and Communication," University of Toronto, http://www.cs.utoronto.ca/~vlad/papers/vlad_phd_singlespace.pdf, 2006 (106 pages).
Berta, I. Z., "Mitigating the Attacks of Malicious Terminals," Budapest University of Technology and Economics, 2005, http://www.berta.hu/publications/Berta2005phd.pdf (96 pages).
Zhu, S., et al., "LEAP+: Efficient Security Mechanisms for Large-Scale Distributed Sensor Networks," Proceedings of the 10th ACM Conference on Computer and Communications Security, pp. 63-72, Oct. 2003, http://cs.gmu.edu/~setia/leap-plus.pdf (28 pages).
Mallow, C., "Authentication Methods and Techniques," Feb. 2007, http://www.giac.org/resources/whitepaper/access/2.pdf (8 pages).

* cited by examiner

*Primary Examiner* — Kambiz Zand
*Assistant Examiner* — Teshome Hailu
(74) *Attorney, Agent, or Firm* — Perkins Coie LLP (57) ABSTRACT

A secure storage system secures information of a client by first encrypting the information with a first key to generate first-key encrypted data. The secure storage system then encrypts with a second key the first-key encrypted data and the first key to generate second-key encrypted data. The system provides the client with a first portion of the second-key encrypted data. The system stores a second portion of the second-key encrypted data and the second key. When the confidential information is needed, the client provides the first portion. The system retrieves the second portion. The system then decrypts with the second key the first portion and the second portion to generate the first-key encrypted data and the first key. The system then decrypts with the first key the first-key encrypted data to generate the unsecure confidential information.

20 Claims, 8 Drawing Sheets

TWO-PARTY STORAGE OF ENCRYPTED SENSITIVE INFORMATION

BACKGROUND

Electronic commerce systems may store confidential or other sensitive information of its customers so that the customers do not need to reenter the confidential information for each new transaction. The confidential information may include a credit card number, a social security number, a password, and so on. It is well known that criminals go to great lengths to steal such confidential information from these electronic commerce systems. Indeed, it has been reported that confidential information of hundreds of millions people stored by web servers and other servers has been compromised by security breaches. To help ensure that the confidential information of their customers is secure, these electronic commerce systems may go to great security lengths. In the case of credit card information, the Payment Card Industry ("PCI") Security Standards Council publishes standards, such as the Data Security Standard ("DSS"), and provides certifications for electronic commerce systems that are in compliance with those standards. Although compliance with such standards can help secure confidential information, criminals are continually developing innovative ways to steal such confidential information.

Because the implementation and certification of electronic commerce systems that comply with industry standards can be both time-consuming and expensive, some software development organizations provide electronic commerce systems that store confidential information of their clients at a central repository, rather than at each client's computer system. By storing the confidential information at a central repository, the software development organization, rather than each client, bears the burden of implementing a secure system and obtaining the necessary certifications. Such storage of confidential information at a central repository is, however, not without risk. The central repository stores the confidential information of many clients, each of which may have tens of thousands of customers. While a breach of the security of a single client may risk the confidential information of only the customers of that client, the breach of the security of the central repository may risk the confidential information of all the customers of all the clients.

To help reduce the risk associated with storing confidential information, some software development organizations may contract with third parties to actually store the confidential information of their clients. Such third parties may specialize in securely storing confidential information at their servers, which may be referred to as "secure storage vaults." Even if a software development organization contracts with such a third party, the software development organization may under some legal systems be liable if security of the third party is breached and the confidential information of its clients falls into the wrong hands.

SUMMARY

A secure storage system secures confidential information of a client by first encrypting the information with a first key to generate first-key encrypted data. The secure storage system then encrypts with a second key the first key to generate a second-key encrypted first key. The secure storage system divides the first-key encrypted data into a first portion and a second portion. The secure storage system generates an identifier for the information and provides the client with the identifier and the first portion and the second-key encrypted first key. The secure storage system stores the second portion, a mapping of the identifier to the second portion, and if necessary, the second key. The secure storage system then discards the information, the first key, and other data used in securing the information.

When the confidential information is needed, the client provides the identifier, the second-key encrypted first key, and the first portion of the first-key encrypted data to the secure storage system. The secure storage system uses the identifier to retrieve the second portion of the first-key encrypted data. The secure storage system then decrypts with the second key the second-key encrypted first key. The secure storage system then decrypts with the first key the first-key encrypted data to generate the unsecure confidential information. The secure storage system can then use the confidential information. When the secure storage system no longer needs the unsecure confidential information, it discards the information, the first key, and other data used in unsecuring the information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for securely storing confidential information using two-party storage is provided. In some embodiments, a secure storage system secures information of clients by first encrypting the information with a first key to generate first-key encrypted data. For example, the information may be a credit card number along with its expiration date or other data needed to complete a credit card transaction. The first key may be a one-time encryption key that is used only to encrypt this particular information. Thus, the first key may be considered to be specific both to the client and the instance of the information being encrypted. The secure storage system then encrypts with a second key the first key itself to generate a second-key encrypted key. Alternatively, the secure storage system may encrypt with the second key both the first-key encrypted data and the first-key resulting in second-key encrypted data. The second key may be a confidential key of the secure storage system that is used to provide a second level of encryption for each instance of information to be encrypted. The secure storage system divides the first-key encrypted data into a first portion and a second portion. The secure storage system generates an identifier for the information and provides the client with the identifier, the second-key encrypted first key, and the first portion. The secure storage system stores the second portion, a mapping of the identifier to the second portion and stores the second key, and if necessary, the second key. The secure storage system then discards the information, the first key, and other data used in securing the information. Because the secure storage system only persistently stores the second portion of the first-key encrypted data, a breach in security of the secure storage system after the securing is complete could only result in obtaining a part of the confidential information. Moreover, since the information is encrypted using the first key, which the secure storage system has discarded, the breach would not result in obtaining even a part of the confidential information. Similarly, because the client stores only the first portion of the first-key encrypted data, a breach of the security of the client would only result in obtaining a different part of the confidential information. Moreover, since the client does not have access to the second key, a breach of the client would not result in obtaining even a part of the confidential information or the first key. Such storage of a portion of the secure information at the secure storage system and another portion at the client is referred to as "two-party storage."

When the confidential information is needed, the client provides the identifier, the second-key encrypted first key, and the first portion of the first-key encrypted data to the secure storage system. The secure storage system uses the identifier to retrieve the second portion of the first-key encrypted data. The secure storage system then decrypts with the second key the second-key encrypted first key resulting in the first key. The secure storage system then decrypts with the first key the first-key encrypted data to generate the unsecure confidential information. The secure storage system can then use the confidential information. The secure storage system then discards the confidential information, the first key, and any other data generated during the unsecuring of the confidential information except for the mapping and the second key The secure storage system may use various techniques for generating the first portion and the second portion for use in the two-party storage. In some embodiments, the secure storage system may encrypt with the second key a combination of the first-key encrypted data and the first key to generate the second-key encrypted data. The secure storage system may then divide the second-key encrypted data into the first portion and the second portion. In such an embodiment, the first portion includes a part of the first-key encrypted data and the first key and the second portion also includes a part of the first-key encrypted data and the first key. In other embodiments, the secure storage system may first divide the first-key encrypted data into a first part and a second part. The secure storage system may then encrypt with the second key a combination of the first part and the first key to generate the first portion of the second-key encrypted data and encrypt with the second key the second part to generate the second portion of the second-key encrypted data. In such other embodiments, the second portion does not include any part of the first key. In other embodiments, the secure server system may divide the confidential information into a first part and a second part before encryption and then encrypt with the first key the first part and the second part to generate a first part of the first-key encrypted data and a second part of the first-key encrypted data. The secure server system may then encrypt with the second key the first part of the first-key encrypted data and a portion or all of the first key to generate the first portion of the second-key encrypted data. The secure server system then encrypts with the second key the second part of the first-key encrypted data with none or a portion of the first key. One skilled in the art will appreciate that various combinations of these embodiments may be used by the secure storage system. For example, as described above, the first and second portions may represent only the confidential information that is encrypted with only the first key and the first key may be encrypted with the second key. In such a case, the first-key encrypted data may be stored with or separately from the second-key encrypted first key.

The secure storage system may use various encryption algorithms based on symmetric or asymmetric keys and may generate the keys using various techniques. The secure storage system may also generate a unique first key each time confidential information is to be encrypted (i.e., referred to as a "one-time key"). Alternatively, it may use a client-specific key as a first key for securing all confidential information of that client. With such an alternative, whenever confidential information of the client is to be used, the client may provide its first key to the secure storage system so that the secure storage system only needs to store that first key when securing or unsecuring confidential information of that client.

In some embodiments, the secure storage system may take advantage of functions of the MICROSOFT WINDOWS API when securing confidential information. The secure storage system may generate a random session key as the first key using the CryptGenKey function of the WINDOWS API specifying the Triple Data Encryption Standard ("3DES") algorithm. The secure storage system then encrypts with the first key the confidential information to generate the first-key encrypted data. The secure storage system then encrypts the first key using a second key that is a public key of the secure storage system that may be from a private certificate (Public Key Infrastructure) of the secure storage system. The secure storage system may encrypt the first key using the CryptExportKey function of the WINDOWS API. The secure storage system stores a first-key encrypted second portion of the first-key encrypted data and provides to the client the first-encrypted other or first portion of the first-key encrypted data and the second-key encrypted first key. The secure storage system may also provide a version identifier to identify the certificate and algorithm. To use the confidential information, the client sends the first-key encrypted first portion and the second-key encrypted first key to the secure storage system. The secure storage system assembles both first-key encrypted portions and decrypts with the second key the second-key encrypted first key. The secure storage system may decrypt the second-key encrypted first key using the CryptImportKey function of the WINDOWS API. The secure storage system then decrypts with the first key the assembled first-key encrypted portions to extract the confidential information.

In some embodiments, the secure storage system may use a secure storage vault to assist in storing of the first portion and/or the second portion of the second-key encrypted data. For example, the secure storage system may store the first portion at the client and the second portion at a secure storage vault. The secure storage system may alternatively store the first portion in a secure storage vault and store the second portion at the secure storage system. Alternatively, the secure storage system may store the first portion at a first secure storage vault and the second portion at a second secure storage vault. The secure storage system selects separate locations for storing the first portion and the second portion so that a breach in security at one location could only provide access to the portion of the confidential information stored at that location.

Figure 1:
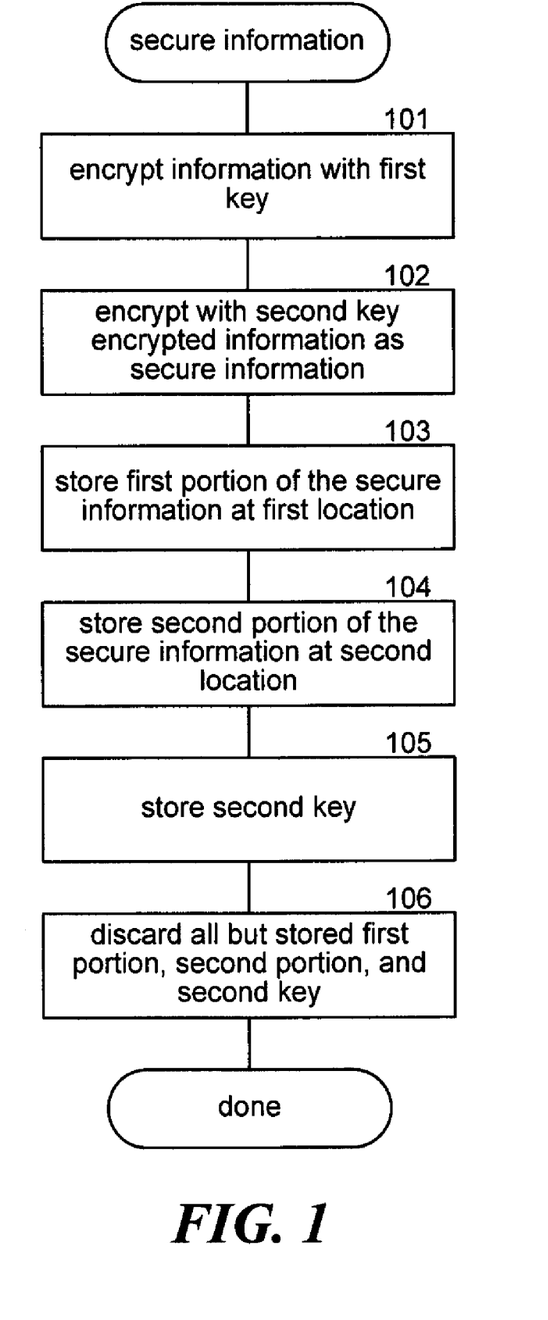
FIG. 1 is a flow diagram that illustrates high-level processing of a component for securing confidential information in some embodiments of the secure storage system.

FIG. 1 is a flow diagram that illustrates high-level processing of a component for securing confidential information in some embodiments of the secure storage system. In block 101, the component encrypts with the first key (which may be a one-time key) the confidential information of the client to generate the first-key encrypted data. In block 102, the component encrypts with the second key (e.g., a key of the secure storage system) the first-key encrypted data and the first key to generate second-key encrypted data. In block 103, the component stores a first portion of the second-key encrypted data at a first location. In block 104, the component stores a second portion of the second-key encrypted data at a second location. In block 105, the component stores the second key, which may be at the second location or at a third location. In block 106, the component discards the data it used during the encryption except for the stored first portion, the stored second portion, and the stored second key. The component then completes.

Figure 2:
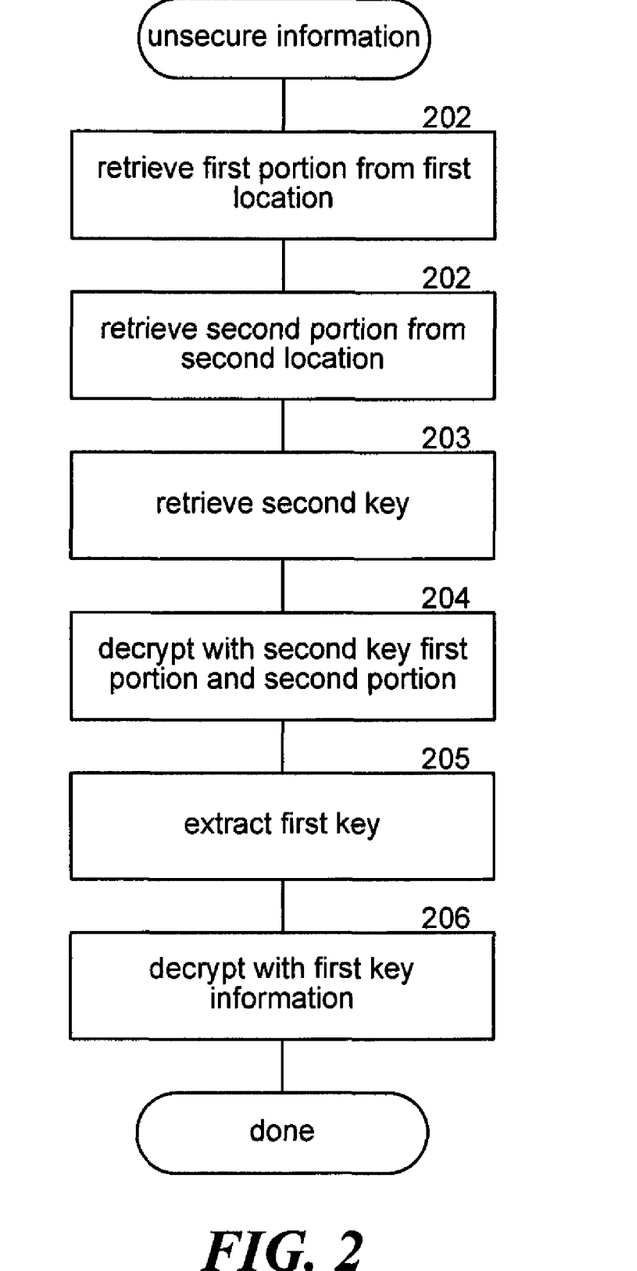
FIG. 2 is a flow diagram that illustrates high-level processing of a component for unsecuring confidential information in some embodiments of the secure storage system.
Figure 3:
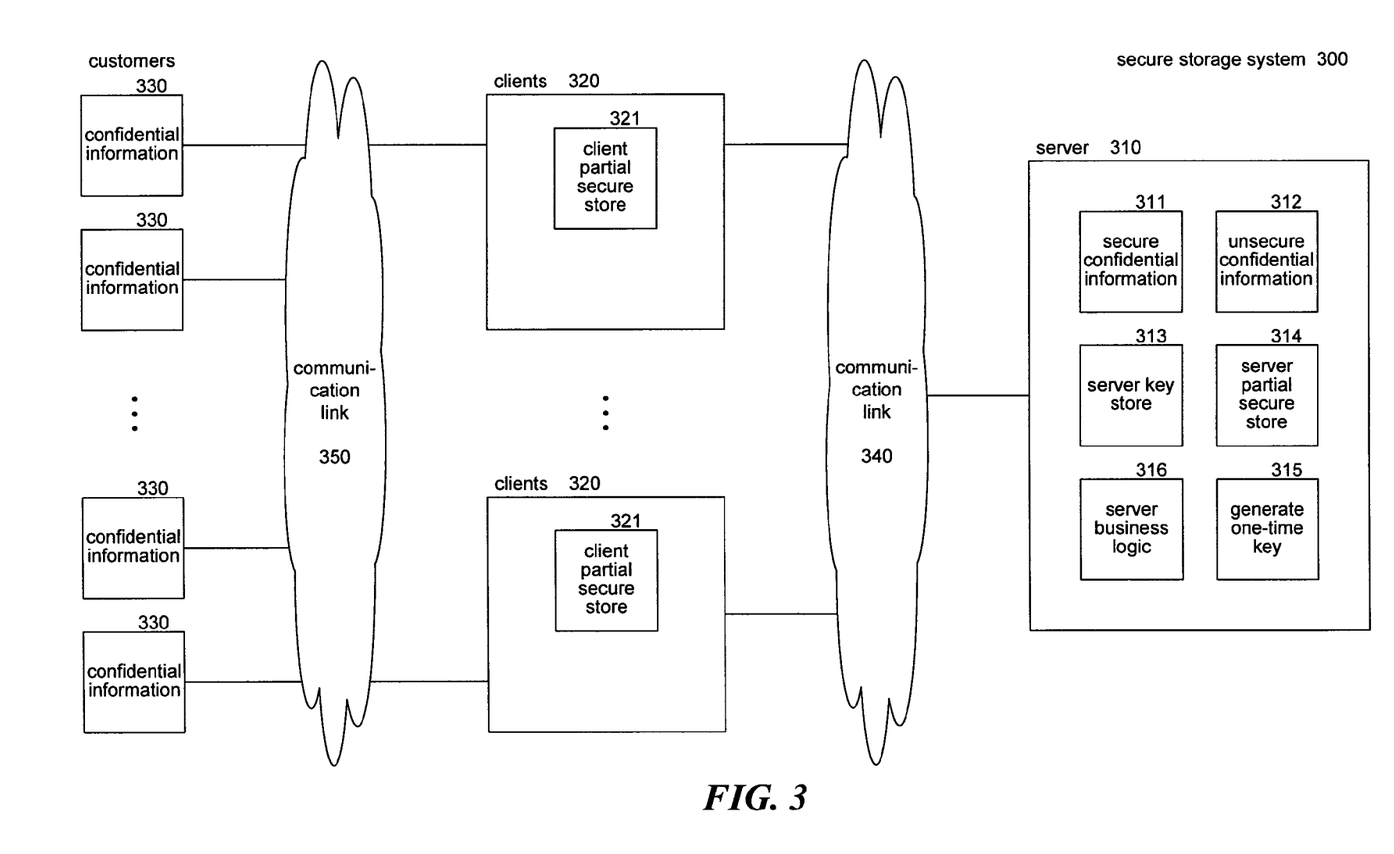
FIG. 3 is a block diagram that illustrates components of a secure storage system in some embodiments.

FIG. 2 is a flow diagram that illustrates high-level processing of a component for unsecuring confidential information in some embodiments of the secure storage system. In block 201, the component receives the first portion of the second-key encrypted data from the first location. In block 202, the component receives the second portion of the second-key encrypted data from the second location. In block 203, the component receives the second key. In block 204, the component decrypts with the second key the first portion and the second portion to generate the first-key encrypted data and the first key. In block 205, the component extracts the first key from the decrypted data. In block 206, the component decrypts with the first key the first-key encrypted data to generate the unsecure confidential information. The component then completes FIG. 3 is a block diagram that illustrates components of a secure storage system in some embodiments. The secure storage system 300 may include a server 310 connected via a communications link 340 to clients 320. The clients may be connected to customers 330 via a communications link 350. The clients may provide electronic commerce services to their customers using an electronic commerce application provided by a software development organization that provides the server for processing transactions such as credit card transactions of the clients. Alternatively, a client may be an enterprise resource planning system ("ERP") or other application that might not be considered an electronic commerce application. Each customer of a client may have one or more credit card numbers that the client wishes to store on behalf of the customer so that the customer does not have to reenter the credit card information for every transaction. The server includes a secure confidential information component 311, an unsecure confidential information component 312, a server key store 313, a server partial secure store 314, a generate one-time key component 315, and server business logic 316. The secure confidential information component secures the confidential information by invoking the generate one-time key component to generate a client or first key. The secure confidential information component then encrypts with the client key the confidential information to generate the client-key encrypted data. The secure confidential information component then retrieves the server or second key from the server key store and encrypts with the server key the client-key encrypted data and the client key to generate the server-key encrypted data. The secure confidential information component then stores a server portion of the server-key encrypted data at the server partial secure store and provides a client portion of the server-key encrypted data to the client for storage at a client partial secure store 321 of the client. The client does not need to know what information is being stored at the client and only needs to know that when a transaction is to be conducted using the confidential information, the client portion needs to be provided to the server. In some embodiments, a client may even store the client portion of the second-key encrypted data at its customers' systems. The unsecure confidential information component is responsible for unsecuring the confidential information when provided with the client portion. The unsecure confidential information component retrieves the corresponding server portion from the server partial secure store, retrieves the server key from the server key store, and unsecures the confidential information. The server business logic then conducts the transaction using the unsecure confidential information.

Figure 4:
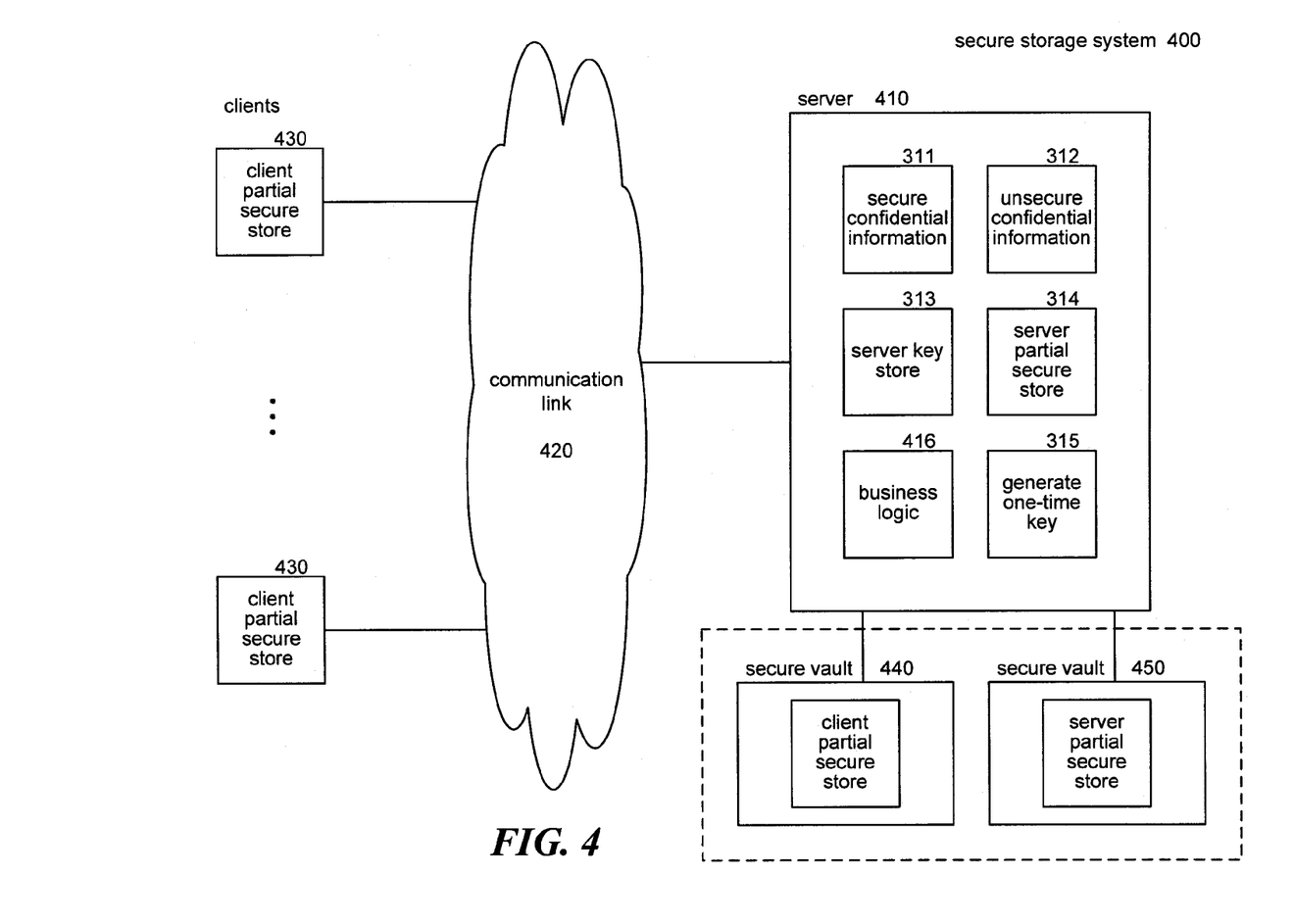
FIG. 4 is a block diagram that illustrates components of a secure storage system in another embodiment.

FIG. 4 is a block diagram that illustrates components of a secure storage system in another embodiment. In this embodiment, a secure storage system 400 may implement an electronic commerce system that interacts directly with customers, referred to as clients. The secure storage system includes a server 410 connected via communications link 420 to various clients 430. For example, the server may provide an electronic commerce system for purchasing various products. The server includes a secure confidential information component 311, an unsecure confidential information component 312, a server key store 313, a server partial secure store 314, a generate one-time key component 315, and an electronic commerce business logic component 416. The server may generate a client portion of server-key encrypted data and provide it to the clients for storage, for example, using a cookie mechanism of the clients' browsers. The server may also store the server portion at the server in the server partial secure store. The server may alternatively store the client portions in a secure storage vault 440 rather than at the clients and/or store the server portions in a secure storage vault 450 rather than in the server partial secure store.

The computing device on which the secure storage system is implemented may include a central processing unit, memory, input devices (e.g., keyboard and pointing devices), output devices (e.g., display devices), and storage devices (e.g., disk drives). Computer-readable media may include computer-readable storage media and data transmission media. The memory and storage devices are computer-readable storage media that may be encoded with computer-executable instructions that implement the secure storage system, which means a computer-readable storage medium that contains the instructions. In addition, the instructions, data structures, and message structures may be transmitted via a data transmission medium, such as a signal on a communication link. Various communication links may be used, such as the Internet, a local area network, a wide area network, a point-to-point dial-up connection, a cell phone network, and so on.

Embodiments of the secure storage system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The secure storage system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the secure confidential information component and the unsecure confidential information component may be implemented on different computer systems.

Figure 5:
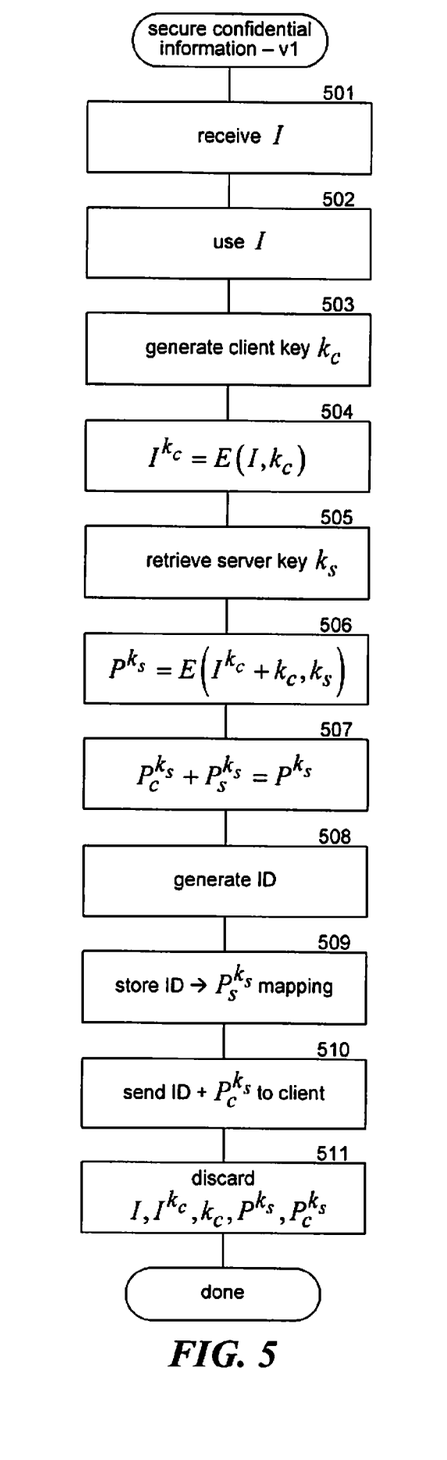
FIG. 5 is a flow diagram that illustrates detailed processing of a first secure confidential information component in some embodiments.

FIG. 5 is a flow diagram that illustrates detailed processing of a first secure confidential information component in some embodiments. In this embodiment, the component encrypts with the server key both the client-key encrypted data and client key to generate server-key encrypted data and then divides the server-key encrypted data into a client portion and a server portion. One skilled in the art will appreciate that this component and other components of the secure storage system can be adapted to implement alternative embodiments. For example, the client-key encrypted data might not be further encrypted with the server key. In block 501, the component receives the confidential information I to be secured. In block 502, the component may use the confidential information I for the application. In block 503, the component generates a first key, referred to as a client key $k_c$. In block 504, the component encrypts with the client key $k_c$ the information I to generate client-key encrypted data $I^{k_c}$. In block 505, the component retrieves a server key $k_s$. In block 506, the component encrypts with the server key $k_s$ the client-key encrypted data $I^{k_c}$ and the client key $k_c$ to generate server-key encrypted data $P^{k_s}$. In block 507, the component divides the server-key encrypted data $P^{k_s}$ into a client or first portion $P_c^{k_s}$ and a server or second portion $P_s^{k_s}$. In block 508, the component generates an identifier for the information. In block 509, the component stores a mapping of the identifier to the server portion $P_s^{k_s}$. In block 510, the component sends the identifier and the client portion $P_c^{k_s}$ to the client for storage at a client location or a first location. In block 511, the component discards data other than the stored mapping (e.g., I, $I^{k_c}$, $k_c$, $P^{k_s}$, and $P_c^{k_s}$) and completes.

Figure 6:
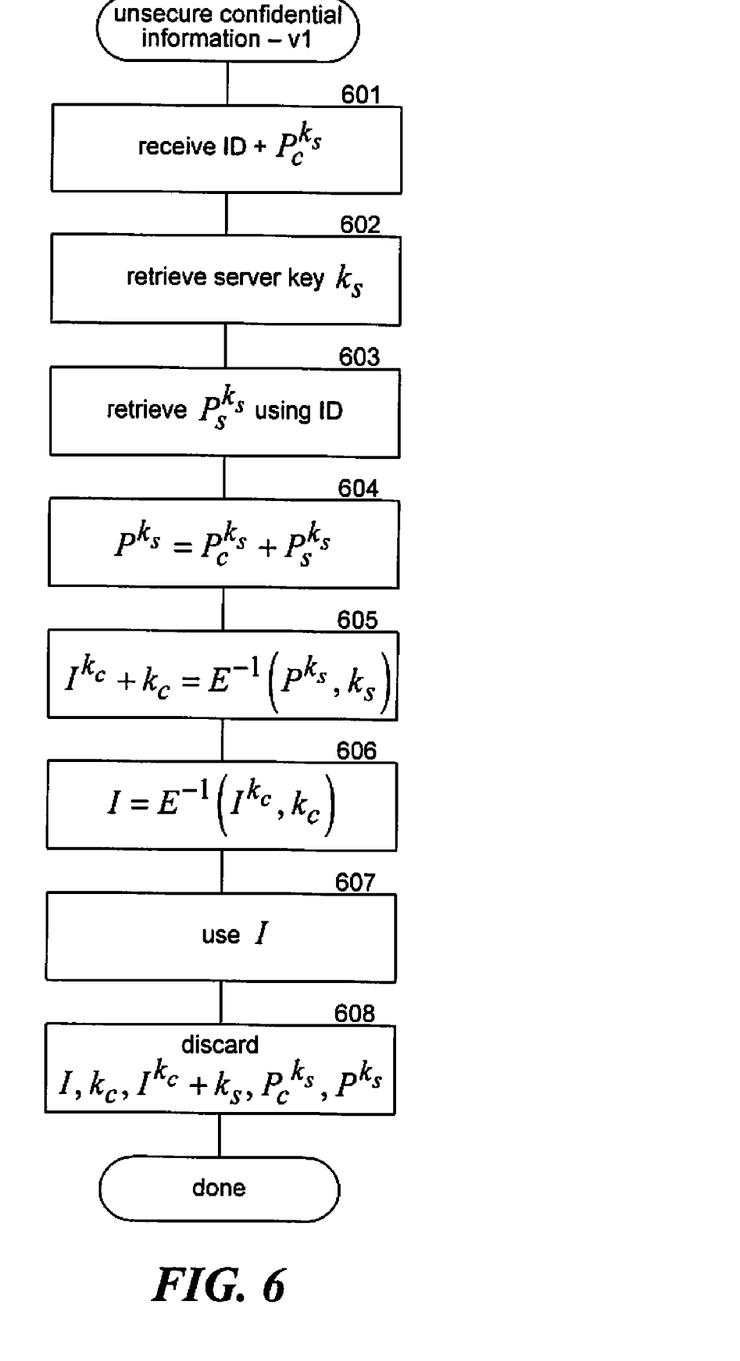
FIG. 6 is a flow diagram that illustrates detailed processing of a first unsecure confidential information component in some embodiments.

FIG. 6 is a flow diagram that illustrates detailed processing of a first unsecure confidential information component in some embodiments. In block 601, the component receives an identifier and client portion $P_c^{k_s}$ from a client. In block 602, the component retrieves the server key $k_s$. In block 603, the component retrieves the server portion $P_s^{k_s}$ using the received identifier. In block 604, the component generates server-key encrypted data $P^{k_s}$ by combining the client portion $P_c^{k_s}$ and server portion $P_s^{k_s}$. In block 605, the component decrypts with the server key $k_s$ the server-key encrypted data $P^{k_s}$ to generate the client-key encrypted data $I^{k_c}$ and the client key $k_c$. In block 606, the component decrypts with the client key $k_c$ the client-key encrypted data $I^{k_c}$. In block 607, the component uses the unsecure information. In block 608, the component discards the data used in the unsecuring except for the original mapping of the identifier to the server portion $P_s^{k_s}$ and completes.

Figure 7:
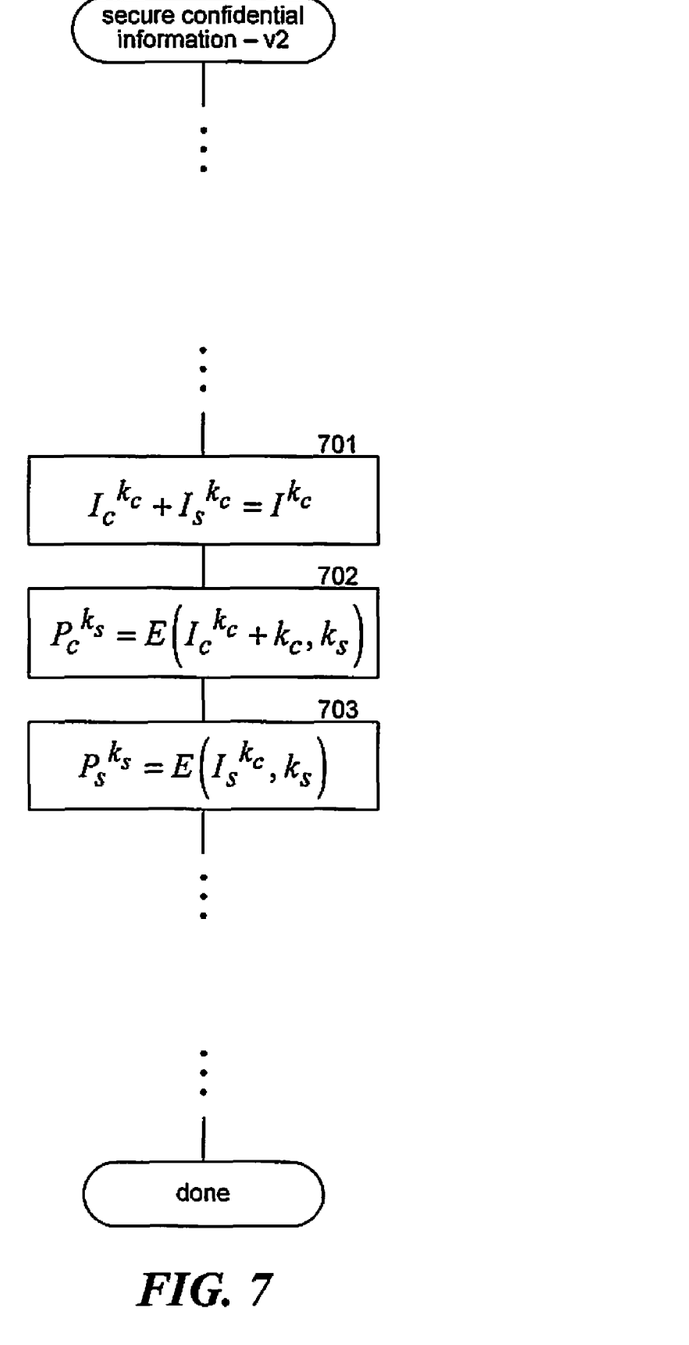
FIG. 7 is a flow diagram that illustrates detailed processing of a second secure confidential information component in some embodiments.

FIG. 7 is a flow diagram that illustrates detailed processing of a second secure confidential information component in some embodiments. The component differs from the component of FIG. 5 in that the client portion $P_c^{k_s}$ is generated by encrypting with the server key $k_s$ a client part $I_c^{k_c}$ of the client-key encrypted data $I^{k_c}$ and the client key $k_c$, and the server portion $P_s^{k_s}$ is generated by encrypting with the server key $k_s$ a server part $I_s^{k_c}$ of the client-key encrypted data $I^{k_c}$. Blocks 701-703 replace blocks 506-507 of FIG. 5. In block 701, the component divides the client-key encrypted data $I_k^c$ into a client part $I_c^{k_c}$ and a server part $I_s^{k_c}$. In block 702, the component encrypts with the server key $k_s$ the client part $I_c^{k_c}$ and the client key $k_c$ to generate the client portion $P_c^{k_c}$ of the server-key encrypted data $P^{k_s}$. In block 703, the component encrypts with the server key $k_s$ the server part $I_s^{k_c}$ to generate the server portion $P_s^{k_s}$ of the server-key encrypted data $P^{k_s}$ and completes.

Figure 8:
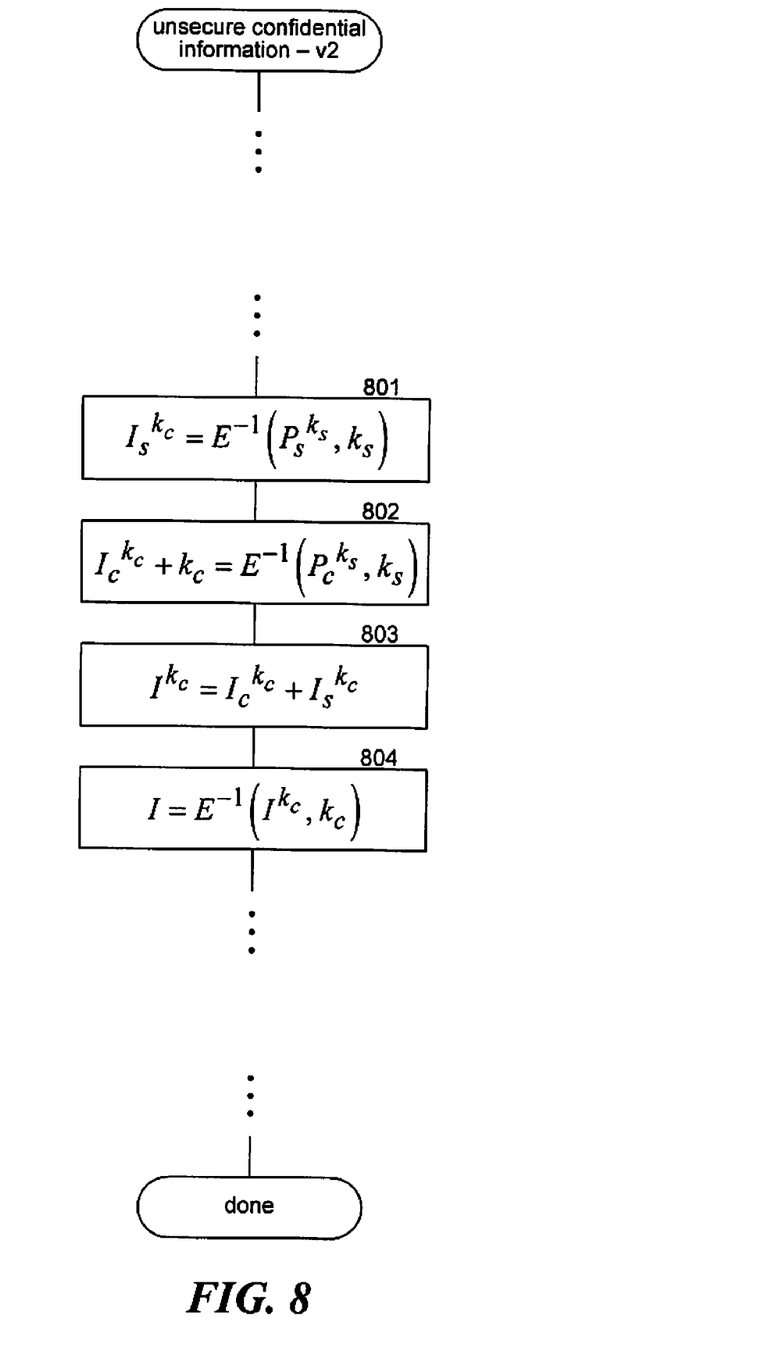
FIG. 8 is a flow diagram that illustrates detailed processing of a second unsecure confidential information component in some embodiments.

FIG. 8 is a flow diagram that illustrates detailed processing of a second unsecure confidential information component in some embodiments. The component unsecures the confidential information secured using the second secure confidential component of FIG. 7. The component functions in a manner similar to that of the first unsecure confidential information component illustrated in FIG. 6 except that blocks 604-606 are replaced by block 801-804. In block 801, the component decrypts with the server key $k_s$ the server portion $P_s^{k_s}$ to generate the server part $I_s^{k_c}$ of the client-key encrypted data $I^{k_c}$. In block 802, the component decrypts with the server key $k_s$ the client portion $P_c^{k_s}$ to generate the client part $I_c^{k_c}$ of the client-key encrypted data $I^{k_c}$ and the client key $k_c$. In block 803, the component combines the client part $I_c^{k_c}$ and the server part $I_s^{k_c}$ to generate the client-key encrypted data $I^{k_c}$. In block 804, the component decrypts with the client key $k_c$ the client-key encrypted data $I^{k_c}$ to generate the unsecure confidential information and completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. When used herein the term key may refer to a symmetric key, a public/private key pair, and so on. The term "key" may refer to either the private key or public key of a public/private key pair. For example, when encrypting the term "key" may refer to the public key and when decrypting the term "key" may refer to the private key, or vice-versa. One skilled in the art will thus understand that the corresponding public key and private key are used depending on the context. Also, the secure storage system may not encrypt with a second key the first-key encrypted data and only encrypt with the second key the first key. The encryption with only the first key may ensure sufficient security without the overhead of encryption with the second key of the confidential information. In some embodiments, after the secure storage system unsecures the confidential information, it may re-secure the confidential information using a different first key. In such a case, the secure storage system would need to provide to the client the newly secured first portion of the data and the encrypted new first key and store the newly secured second portion to replace the previously stored second portion. The use of a new first key may be needed to meet the requirements of standards, which may require data stored at a server to reencrypt with a different key in certain situations. Accordingly, the invention is not limited except as by the appended claims.

We claim:

1. A computer-readable storage device containing instructions for controlling a computing device to store information securely, by a method comprising:
   securing the information by encrypting with a first key the information to generate first-key encrypted data and encrypting with a second key the first key to generate a second-key encrypted first key;
   directing storage of a first portion of the first-key encrypted data and the second-key encrypted first key at a first location and a second portion of the first-key encrypted data at a second location, the first location and the second location being separate storage devices; and
   when the secured information is to be used, receiving the first portion of the first-key encrypted data and the second-key encrypted first key from the first location and the second portion of the first-key encrypted data from the second location;

unsecuring the secured information by decrypting with the second key the second-key encrypted first key to extract the first key and decrypting with the extracted first key the received first portion and the received second portion to extract the information, wherein after the information is secured and until the secured information needs to be unsecured, the first location and the second location each store only a portion of the first-key encrypted data and neither the first location nor the second location stores a complete copy of both the first key and the second key.

2. The computer-readable storage device of claim 1 wherein the information to be secured is provided by a client to a server and the server secures the information for storage of the first portion under control of the client and storage of the second portion under control of the server.

3. The computer-readable storage device of claim 2 wherein the server generates the first key for use in encrypting the information of the client.

4. The computer-readable storage device of claim 1 wherein the directing of storage of the first portion includes using a cookie mechanism to store the first portion.

5. The computer-readable storage device of claim 1 wherein at least one of the first location and the second location is a secure storage server separate from a server that secures the information.

6. The computer-readable storage device of claim 1 including generating an identifier and directing storage of the identifier at the first location and the second location so that the first portion and the second portion can be matched when the information is be unsecured.

7. The computer-readable storage device of claim 1 wherein
the first portion is generated by encrypting with the first key a first part of the information to generate the first portion of the first-key encrypted data; and
the second portion is generated by encrypting with the first key a second part of the information to generate the second portion of the first-key encrypted data
wherein the first portion and the second portion include all of the information.

8. The computer-readable storage device of claim 7 wherein the second portion is generated by further encrypting with the second key the second part of the first-key encrypted data.

9. The computer-readable storage device of claim 1 wherein the first portion and the second portion are generated by
encrypting with the first key the information to generate the first-key encrypted data; and
generating the first portion by encrypting with the second key a first part of the first-key encrypted data and the first key;
wherein the second portion comprises a second part of the first-key encrypted data such that the first part and the second part include all of the first-key encrypted data.

10. The computer-readable storage device of claim 9 wherein the second part is further encrypted with the second key to form the second portion.

11. The computer-readable storage device of claim 1 wherein the first portion and the second portion are generated by:
encrypting with the first key the information to generate the first-key encrypted data;
encrypting with the second key the first-key encrypted data and the first key to generate the second-key encrypted data,
wherein the first portion comprises a first part of the second-key encrypted data and the second portion comprises a remainder of the second-key encrypted data.

12. A computer system with a processor and memory for securing information, comprising:
a component that encrypts with a first key the information to generate first-key encrypted data;
a component that encrypts with a second key the first key to generate second-key encrypted first key; and
a component that directs storage of a first portion of the first-key encrypted data and the second-key encrypted first key at a first location and a second portion of the first-key encrypted data at a second location, the first location and the second location being separate storage devices,
wherein the components are implemented as computer-readable instructions stored in memory for execution by the processor.

13. The computer system of claim 12, further comprising:
a component that receives the first portion of the first-key encrypted data and the second-key encrypted first key from the first location and the second portion of the first-key encrypted data from the second location;
a component that decrypts with the second key the second-key encrypted first key to extract the first key; and
a component that decrypts with the extracted first key the first-key encrypted data to extract the information.

14. The computer system of claim 12 wherein
the first portion is generated by a component that encrypts with the first key a first part of the information to generate the first portion of the first-key encrypted data; and
the second portion is generated by a component that encrypts with the first key a second part of the information to generate the second portion of the first-key encrypted data,
wherein the first part and the second part include all of the information.

15. The computer system of claim 14 wherein the second portion is generated by further encrypting with the second key the second part of the first-key encrypted data.

16. The computer system of claim 12 wherein the first portion and the second portion are generated by a component that
encrypts with the first key the information to generate the first-key encrypted data; and
generates the first portion by encrypting with the second key a first part of the first-key encrypted data,
wherein the second portion comprises a second part of the first-key encrypted data such that the first part and the second part include all of the first-key encrypted data.

17. The computer system of claim 12 wherein the first portion and the second portion are generated by a component that
encrypts with the first key the information to generate the first-key encrypted data; and
encrypts with the second key the first-key encrypted data to generate the second-key encrypted data,
wherein the first portion comprises a first part of the second-key encrypted data and the second portion comprises a remainder of the second-key encrypted data.

18. A computer system with a processor and memory for unsecuring information, comprising:

a component that receives a first portion of first-key encrypted data and a second-key encrypted first key from a first location and a second portion of the first-key encrypted data from a second location, the first location and the second location being separate storage devices;

a component that decrypts with a second key the received second-key encrypted first key to extract the first key; and a component that decrypts with the first key the first-key encrypted data to extract the information, wherein the components are implemented as computer-readable instructions stored in memory for execution by the processor.

19. The computer system of claim 18 including:

a component that encrypts with the first key the information to generate the first-key encrypted data;

a component that encrypts with the second key the first-key encrypted data and the first key to generate second-key encrypted data; and a component that directs storage of the first portion of the second-key encrypted data at the first location and the second portion of the second-key encrypted data at the second location.

20. The computer system of claim 18 including:

a component that encrypts with the first key the information to generate the first-key encrypted data;

a component that divides the first-key encrypted data into a first part and a second part;

a component that encrypts with the second key a combination of the first part and the first key to generate a first portion of a second-key encrypted data;

a component that encrypts with the second key the second part to generate a second portion of the second-key encrypted data;

a component that decrypts with the second key the first portion and the second portion of the second-key encrypted data; and a component that combines into the first-key encrypted data the first part of the decrypted first portion and the second part of the decrypted second portion.

* * * * *